No. 635,547.　　　　　　　　　　　　　　　Patented Oct. 24, 1899.
H. A. HOWARD.
SQUID.
(Application filed Apr. 12, 1899.)

(No Model.)

WITNESSES:　　　　　　　　　　　　　　　INVENTOR
　　　　　　　　　　　　　　　　　　　　Herbert A. Howard
　　　　　　　　　　　　　　　　　　BY
　　　　　　　　　　　　　　　　　　　　ATTORNEYS.

UNITED STATES PATENT OFFICE.

HERBERT ALLEN HOWARD, OF HUNTINGTON, NEW YORK.

SQUID.

SPECIFICATION forming part of Letters Patent No. 635,547, dated October 24, 1899.

Application filed April 12, 1899. Serial No. 712,750. (No model.)

*To all whom it may concern:*

Be it known that I, HERBERT ALLEN HOWARD, of Huntington, in the county of Suffolk and State of New York, have invented new and useful Improvements in Squids, of which the following is a full, clear, and exact description.

This invention relates to improvements in squids used in trolling for fish; and the object is to provide a squid of simple and comparatively inexpensive construction and having barbs adapted to be forced outward to engage in the jaws of a fish upon the fish taking the squid.

I will describe a squid embodying my invention and then point out the novel features in the appended claims.

Reference is to be had to the accompanying drawings, forming a part of this specification, in which similar characters of reference indicate corresponding parts in both figures.

Figure 1:
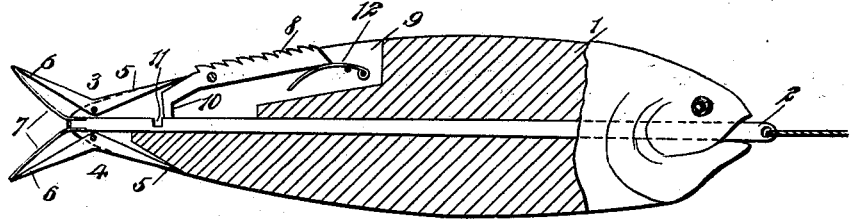
Figure 2:
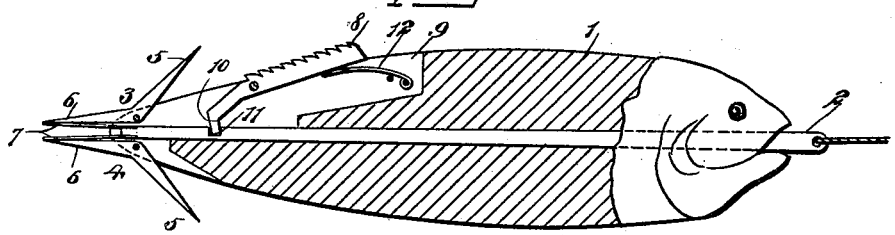

Figure 1 is a longitudinal section of a squid embodying my invention and showing the barbs in their closed position, and Fig. 2 is a similar view showing the barbs in open position.

Referring to the drawings, 1 designates the squid-body, of the usual outline and made of any suitable material. Movable in an opening formed longitudinally through the squid is a draw-rod 2, to the forward end of which a trolling-line is designed to be attached.

Pivoted in a recess formed at the tail end of the squid are angle-plates 3 4, the forward portions 5 of which are in the form of pointed barbs designed when distended to engage in the jaws of a fish. The rearwardly-extended portions 6 of the angle-plates have their ends connected to the draw-rod 2 by means of spring-plates 7, and when divergent, as in Fig. 1, these portions 6, with the springs 7, will represent the tail of a fish or squid.

A lever 8 is pivoted in a recess 9 made in the back of the squid and is designed to engage its downwardly-turned end 10 with the rod 2 and also to engage said end in a notch 11, formed in the rod, as will hereinafter appear. The lever is held yieldingly against the rod by means of a spring 12, bearing against the lever forward of its pivot-point, and the upper edge of the lever, which normally projects above the back of the squid, may be corrugated to represent a fin.

In operation the parts are to be set in the position indicated in Fig. 1 while trolling—that is, the portions 6 of the angle-plates are to be placed divergent, with the barbs seated in the recesses formed in the squid or against the body portion of the squid, and the parts will be held in this position by means of the frictional bearing of the lever 8 upon the rod 2. When a fish grabs the squid and upon closing its jaws, the lever 8 will be rocked sufficiently to release the rod 2. Then as the squid is drawn rearward on the rod the barbs will be distended to engage in the upper and lower jaws of the fish and the end of the lever will be forced into the notch 11, locking the barbs in their distended position.

It will be seen that a squid made in accordance with my invention is very simple in construction and not liable to get out of order or to break, and, further, that the barbs may be easily disengaged from the fish's jaws by moving the end 10 of the lever from the notch 11 and then drawing the squid forward on the rod 2, and therefore it will not be necessary to take hold of the fish, as is required to disengage the ordinary squid-hook from a fish.

Having thus described my invention, I claim as new and desire to secure by Letters Patent—

1. A squid, comprising a body portion, angle-plates pivoted at the tail end of the body portion and having their forwardly-extended portions adapted for engaging the body portion while the rearwardly-extended portions are divergent, a rod movable lengthwise in the body and having yielding connections with the angle-plates, and a spring-pressed lever for holding the rod, substantially as specified.

2. A squid, comprising a body portion, angle-plates pivoted at the tail end of the body portion, each of said plates having a rearwardly-extended portion and a forwardly-extended barb, a rod movable lengthwise in the body, spring connections between said rod and the rearwardly-extended portions of the angle-plates, and a spring-pressed lever for engaging with said rod, and also for engaging in a notch formed in the rod, substantially as specified.

HERBERT ALLEN HOWARD.

Witnesses:
CHAS. E. SAMMIS,
JOSEPH IRWIN.